US012671348B2

(12) United States Patent
Cayford et al.

(10) Patent No.: US 12,671,348 B2
(45) Date of Patent: Jun. 30, 2026

(54) METHODS AND APPARATUS FOR CONTROLLING SWITCH GATE LOGIC IN A POWER CONVERTER

(71) Applicant: Enphase Energy, Inc., Petaluma, CA (US)

(72) Inventors: Damon Charles Cayford, Lyttelton (NZ); Michael J. Harrison, Petaluma, CA (US); Rick Sanders, Wellington (NZ)

(73) Assignee: Enphase Energy, Inc., Petaluma, CA (US)

( * ) Notice: Subject to any disclaimer, the term of this patent is extended or adjusted under 35 U.S.C. 154(b) by 268 days.

(21) Appl. No.: 18/387,518

(22) Filed: Nov. 7, 2023

(65) Prior Publication Data

US 2024/0178764 A1    May 30, 2024

Related U.S. Application Data

(60) Provisional application No. 63/428,789, filed on Nov. 30, 2022.

(51) Int. Cl.
H02M 7/537 (2006.01)
H02M 7/48 (2007.01)

(52) U.S. Cl.
CPC ......... H02M 7/537 (2013.01); H02M 7/4815 (2021.05)

(58) Field of Classification Search
CPC .... H02M 5/297; H02M 7/537; H02M 7/4815; H02M 7/4807; H02M 1/0058; H02M 1/08
See application file for complete search history.

(56) References Cited

U.S. PATENT DOCUMENTS

| | | | | |
|---|---|---|---|---|
| 8,520,409 B2 * | 8/2013 | Harrison | ............... | H02M 7/217 363/21.02 |
| 9,678,519 B1 * | 6/2017 | Alexander | ............... | G05F 1/10 |
| 10,924,024 B2 * | 2/2021 | Norisada | ............... | H02M 5/293 |

(Continued)

FOREIGN PATENT DOCUMENTS

| | | | | |
|---|---|---|---|---|
| CN | 102106069 A | * | 6/2011 | ............ H02M 5/297 |
| EP | 2309633 B1 | * | 3/2019 | ............ H02M 5/297 |
| JP | 2011151528 A | * | 8/2011 | |

OTHER PUBLICATIONS

Machine Translation CN-102106069-A (Year: 2011).*

(Continued)

*Primary Examiner* — Thienvu V Tran
*Assistant Examiner* — Yahveh Comas Torres
(74) *Attorney, Agent, or Firm* — Moser Taboada

(57) ABSTRACT

A cycloconverter configured for use with a power converter is provided herein and comprises a bidirectional switch operable in a first mode of operation when an AC mains voltage is equal to or greater than a predetermined voltage and a second mode of operation when the AC mains voltage is less than the predetermined voltage, such that during zero voltage switching (ZVS) commutations a first Gate of a first pair of Gallium-Nitride (GaN) High Electron Mobility Transistors is on, a second Gate of the first pair of Gallium-Nitride (GaN) High Electron Mobility Transistors is off, and the first Gate and the second Gate of a second pair of Gallium-Nitride (GaN) High Electron Mobility Transistors are off.

12 Claims, 6 Drawing Sheets

NORMAL MODE SWITCHING

SAFE+ MODE SWITCHING

(56) References Cited

U.S. PATENT DOCUMENTS

| | | | | |
|---|---|---|---|---|
| 2004/0027843 | A1* | 2/2004 | Mahlein | H02M 5/2573 |
| | | | | 363/159 |
| 2009/0065810 | A1 | 3/2009 | Honea et al. | |
| 2009/0323380 | A1* | 12/2009 | Harrison | H02M 7/217 |
| | | | | 363/126 |
| 2010/0284208 | A1* | 11/2010 | Nguyen | H02M 7/4807 |
| | | | | 363/160 |
| 2012/0063184 | A1 | 3/2012 | Mazumder | |
| 2016/0141972 | A1* | 5/2016 | Yamada | H02M 7/797 |
| | | | | 363/37 |
| 2017/0040908 | A1 | 2/2017 | Fornage et al. | |
| 2019/0207527 | A1* | 7/2019 | Norisada | H02M 7/797 |
| 2022/0416679 | A1* | 12/2022 | Wang | H02M 1/0058 |

OTHER PUBLICATIONS

Machine Translation EP_2309633 (Year: 2019).*
Machine Translation JP-2011151528-A (Year: 2010).*
PCT International Search Report and Written Opinion for PCT/US2023/036648 dated Feb. 23, 2024.

* cited by examiner

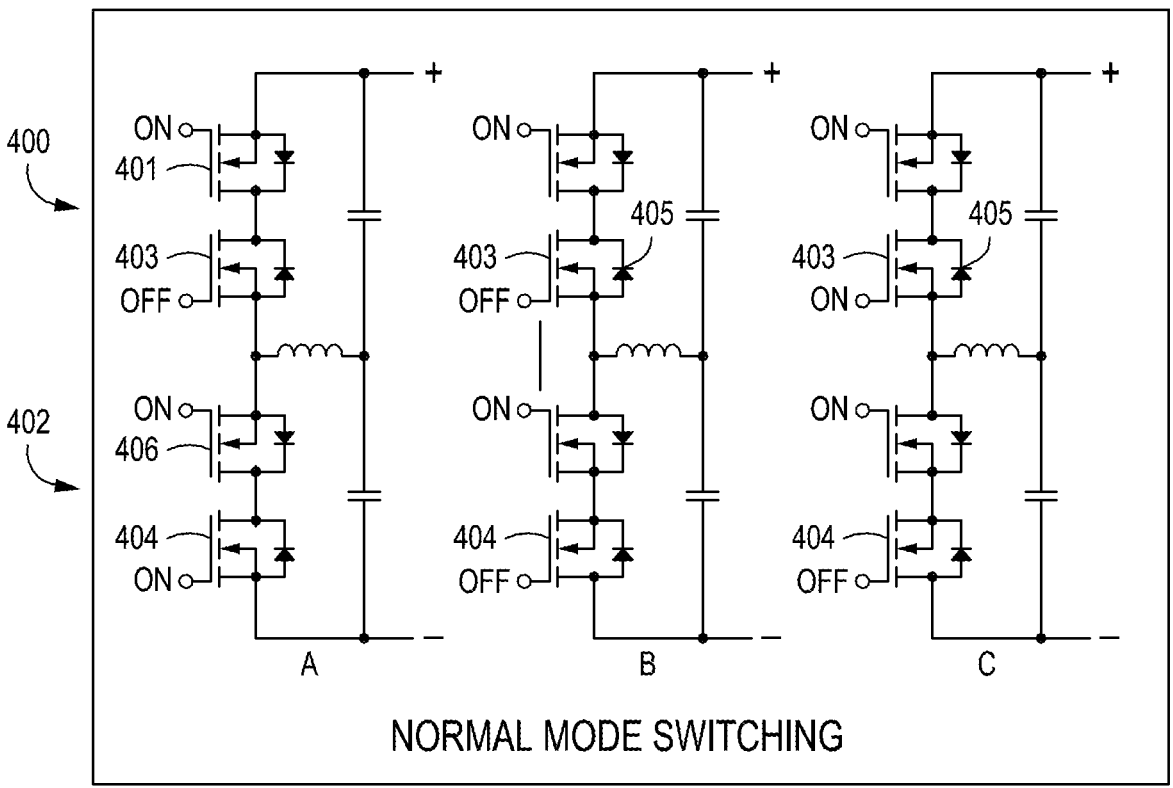
NORMAL MODE SWITCHING
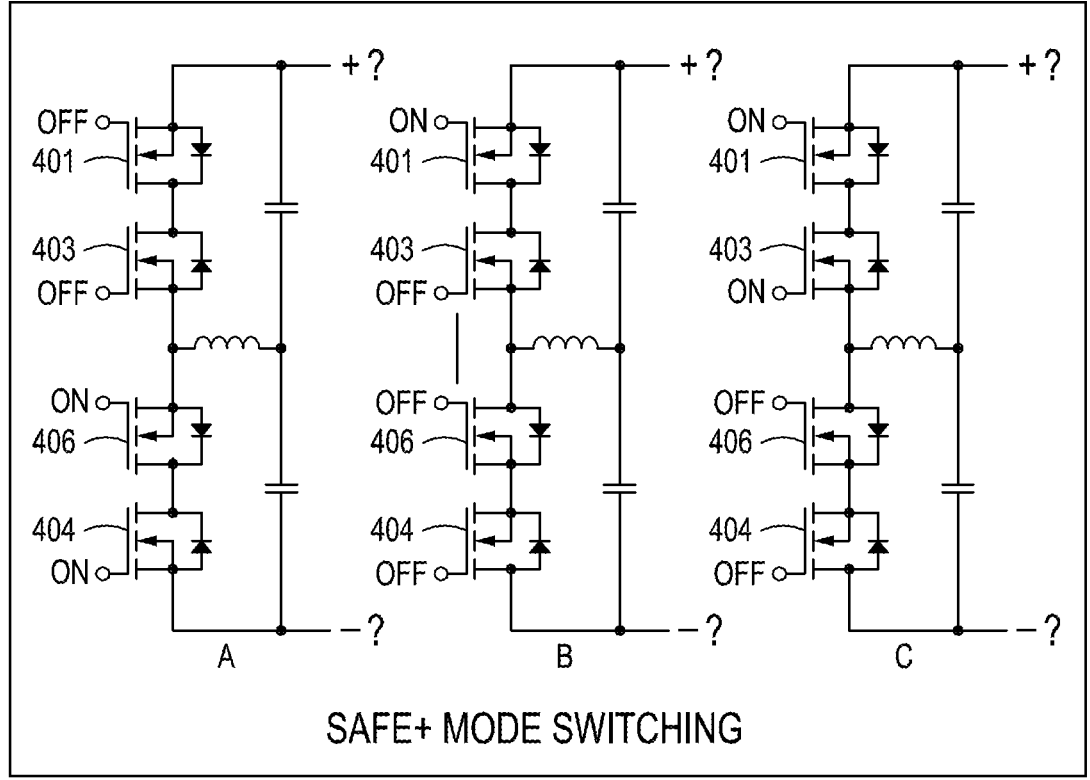
SAFE+ MODE SWITCHING
FIG. 4

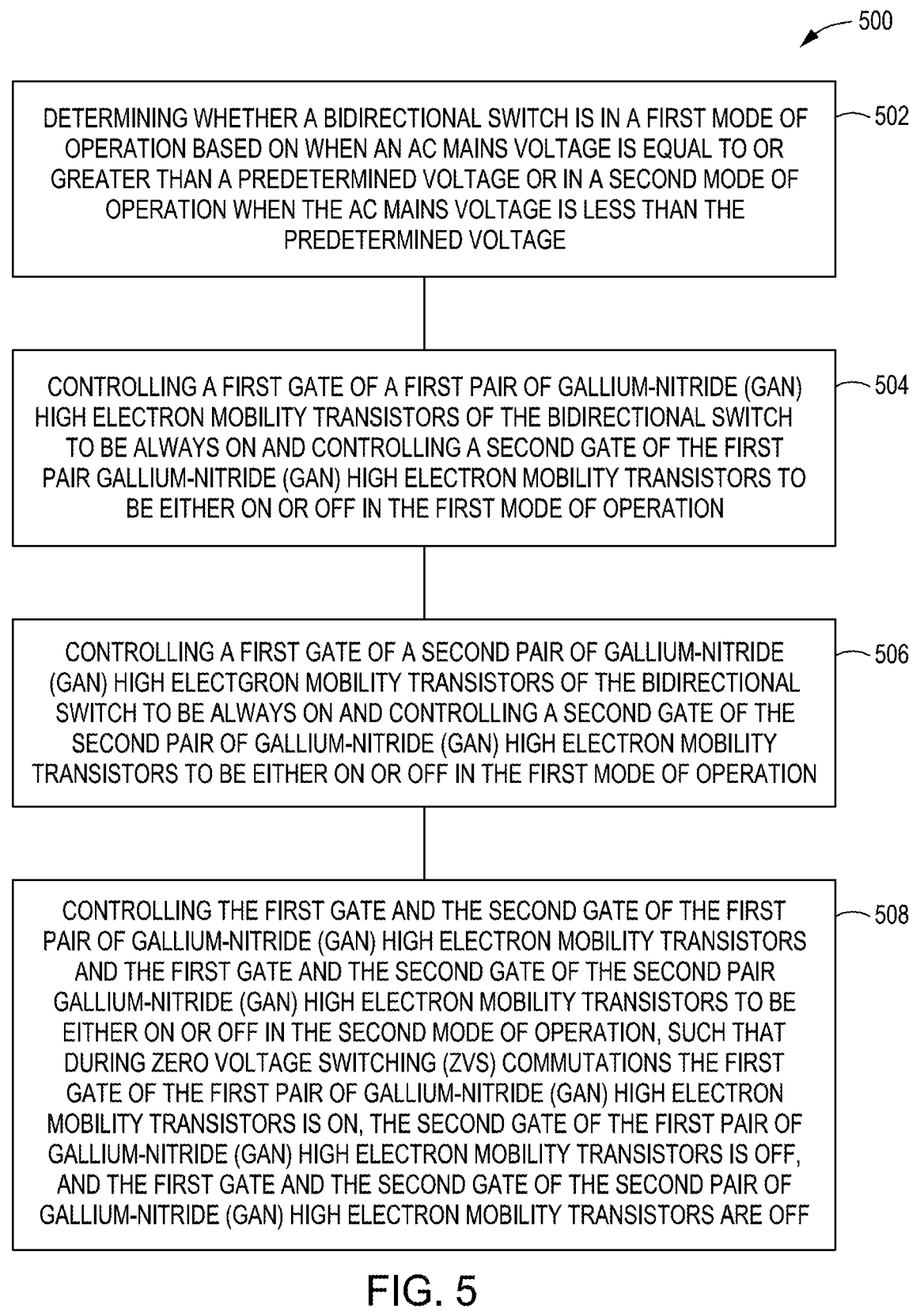

500

DETERMINING WHETHER A BIDIRECTIONAL SWITCH IS IN A FIRST MODE OF OPERATION BASED ON WHEN AN AC MAINS VOLTAGE IS EQUAL TO OR GREATER THAN A PREDETERMINED VOLTAGE OR IN A SECOND MODE OF OPERATION WHEN THE AC MAINS VOLTAGE IS LESS THAN THE PREDETERMINED VOLTAGE ─502

CONTROLLING A FIRST GATE OF A FIRST PAIR OF GALLIUM-NITRIDE (GAN) HIGH ELECTRON MOBILITY TRANSISTORS OF THE BIDIRECTIONAL SWITCH TO BE ALWAYS ON AND CONTROLLING A SECOND GATE OF THE FIRST PAIR GALLIUM-NITRIDE (GAN) HIGH ELECTRON MOBILITY TRANSISTORS TO BE EITHER ON OR OFF IN THE FIRST MODE OF OPERATION ─504

CONTROLLING A FIRST GATE OF A SECOND PAIR OF GALLIUM-NITRIDE (GAN) HIGH ELECTGRON MOBILITY TRANSISTORS OF THE BIDIRECTIONAL SWITCH TO BE ALWAYS ON AND CONTROLLING A SECOND GATE OF THE SECOND PAIR OF GALLIUM-NITRIDE (GAN) HIGH ELECTRON MOBILITY TRANSISTORS TO BE EITHER ON OR OFF IN THE FIRST MODE OF OPERATION ─506

CONTROLLING THE FIRST GATE AND THE SECOND GATE OF THE FIRST PAIR OF GALLIUM-NITRIDE (GAN) HIGH ELECTRON MOBILITY TRANSISTORS AND THE FIRST GATE AND THE SECOND GATE OF THE SECOND PAIR GALLIUM-NITRIDE (GAN) HIGH ELECTRON MOBILITY TRANSISTORS TO BE EITHER ON OR OFF IN THE SECOND MODE OF OPERATION, SUCH THAT DURING ZERO VOLTAGE SWITCHING (ZVS) COMMUTATIONS THE FIRST GATE OF THE FIRST PAIR OF GALLIUM-NITRIDE (GAN) HIGH ELECTRON MOBILITY TRANSISTORS IS ON, THE SECOND GATE OF THE FIRST PAIR OF GALLIUM-NITRIDE (GAN) HIGH ELECTRON MOBILITY TRANSISTORS IS OFF, AND THE FIRST GATE AND THE SECOND GATE OF THE SECOND PAIR OF GALLIUM-NITRIDE (GAN) HIGH ELECTRON MOBILITY TRANSISTORS ARE OFF ─508

FIG. 5

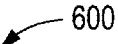
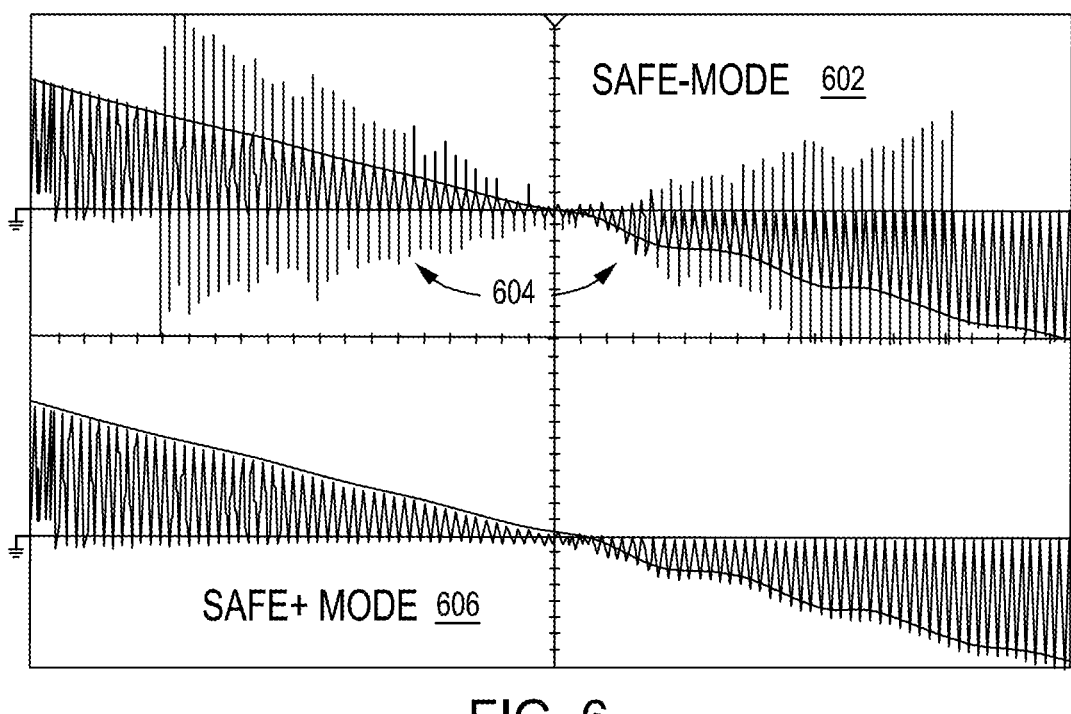
FIG. 6

METHODS AND APPARATUS FOR CONTROLLING SWITCH GATE LOGIC IN A POWER CONVERTER

CROSS-REFERENCE TO RELATED APPLICATIONS SECTION

This application claims the benefit of and priority to U.S. Provisional Application Ser. No. 63/428,789, filed on Nov. 30, 2022, the entire contents of which is incorporated herein by reference.

BACKGROUND

Field of the Disclosure

Embodiments of the present disclosure relate generally to power conversion and, in particular, to methods and apparatus for controlling switch Gate logic in a power converter.

Description of the Related Art

Conventional bidirectional switches (BDS) are known and can be made by connecting a pair of conventional unidirectional power transistors together—either in a common-Source or common-Drain connection configuration (common-Emitter or common-Collector). For example, some bidirectional switches (BDS) can use a pair of silicon Super-Junction (Si SJ) MOSFETs (Metal Oxide Semiconductor Field Effect Transistors) for each cycloconverter bidirectional switch. Such switches can be operable in one or more modes. For example, when the bidirectional switch is in a Normal Mode, switching can be implemented by keeping one Gate turned on all of the time (e.g., a reverse Gate) and only turning the other Gate on and off to affect the switching of the BDS device (e.g., a forward Gate).

However, an inherent limitation (weakness) exists with Normal Mode switching which comes from the requirement for the polarity of the AC mains voltage (blocking voltage polarity) to be known in order to know which of the two Gates is the forward Gate and, hence, which Gate should be turned on & off to affect switching. Part of such a limitation stems from the realization that the BDS blocking voltage is only defined when the BDS is turned off, however, the blocking voltage polarity needs to be correctly known while the BDS is in an on state when no blocking voltage imposed across the BDS. For example, if an AC mains voltage polarity is incorrectly identified, then the wrong Gate of the BDS will be turned off and will not become apparent that the wrong Gate was turned off until after the event, which is too late. Another contributing factor to the limitation stems from the limited precision related to any observation or measurement.

While the AC mains voltage has a high absolute instantaneous value, the AC mains voltage polarity can be determined with a high degree of certainty. As the instantaneous AC mains voltage approaches a zero-voltage crossing point, however, there comes a point when determining the voltage polarity with certainty becomes difficult (and impossible at zero). The inherent weakness related to Normal Mode switching comes from the need to know with certainty the polarity of the AC mains voltage (blocking voltage polarity) on the basis that getting the polarity wrong and turning off the wrong Gate of the BDS device will not result in a desired result of blocking the BDS current. For example, if a wrong Gate of the BDS is turned off, then a body Diode of the field effect transistor (FET) that is turned off, will provide a path for current to flow from the AC mains source directly through the BDS device, thus resulting in the BDS device providing a short circuit directly across the AC mains voltage source. While the short circuit based on the instantaneous AC mains voltage being close to zero is not optimal for operation, the short circuit across the AC mains caused by the wrong BDS Gate being turned off can lead to a degenerative condition. That is, noise created by the short circuit condition makes identifying the correct AC mains voltage polarity rather difficult. The degenerative condition can persist for a period until the instantaneous AC mains voltage becomes large enough that the correct polarity can be identified despite the noise generated by the short circuit condition. Again, although such a degenerative condition does not physically damage the BDS device(s), the degenerative condition can contribute to unwanted effects to electro-magnetic interference (EMI).

Conventional methods and apparatus use a safe mode switching for eliminating the degenerative condition. For example, safe mode works by turning both Gates of the BDS on and off during a period close to an AC mains voltage zero cross point. Safe mode operation, however, has one or more drawbacks, e.g., increased Gate drive power consumption and loss of zero voltage switching (ZVS) diode catch function. With respect to increase Gate drive power, during a $\pm 5°$ period each AC mains (half) cycle, a Gate drive energy (power) consumption is double what the Normal Mode switching would be during the same period, which, in turn results in about a 5.6% increase in the Gate drive power consumption compared to a power consumption if Normal Mode switching was used the entire AC mains cycle Similarly, with respect to loss of ZVS diode catch function, during the $\pm 5°$ period each AC mains (half) cycle that safe mode switching is employed, voltage over-shoot at the end of each ZVS communication is present, which can compromise electro-magnetic compliance (EMC) of a power converter.

Thus, there is a need for improved methods and apparatus for controlling switch Gate logic in a power converter.

SUMMARY

In accordance with at least some embodiments, a cycloconverter configured for use with a power converter comprises a bidirectional switch comprising a first pair of Gallium-Nitride (GaN) High Electron Mobility Transistors and a second pair of Gallium-Nitride (GaN) High Electron Mobility Transistors, the bidirectional switch operable in a first mode of operation when an AC mains voltage is equal to or greater than a predetermined voltage and a second mode of operation when the AC mains voltage is less than the predetermined voltage. In the first mode of operation a first Gate of the first pair of Gallium-Nitride (GaN) High Electron Mobility Transistors is always on and a second Gate of the first pair Gallium-Nitride (GaN) High Electron Mobility Transistors is either on or off. In the first mode of operation a first Gate of the second pair of Gallium-Nitride (GaN) High Electron Mobility Transistors is always on and a second Gate of the second pair of Gallium-Nitride (GaN) High Electron Mobility Transistors is either on or off. In the second mode of operation the first Gate and the second Gate of the first pair of Gallium-Nitride (GaN) High Electron Mobility Transistors and the first Gate and the second Gate of the second pair Gallium-Nitride (GaN) High Electron Mobility Transistors are either on or off, such that during zero voltage switching (ZVS) commutations the first Gate of the first pair of Gallium-Nitride (GaN) High Electron Mobility Transistors is on, the second Gate of the first pair of Gallium-Nitride (GaN) High Electron Mobility Transistors is off, and the first Gate and the second Gate of the second pair of Gallium-Nitride (GaN) High Electron Mobility Transistors are off.

In accordance with at least some embodiments, a method of controlling bidirectional switch Gate drive logic (e.g., Safe+ Mode switching) comprises determining whether a bidirectional switch is in a first mode of operation based on when an AC mains voltage is equal to or greater than a predetermined voltage or in a second mode of operation when the AC mains voltage is less than the predetermined voltage, controlling a first Gate of a first pair of Gallium-Nitride (GaN) High Electron Mobility Transistors of the bidirectional switch to be always on and controlling a second Gate of the first pair Gallium-Nitride (GaN) High Electron Mobility Transistors to be either on or off in the first mode of operation, controlling a first Gate of a second pair of Gallium-Nitride (GaN) High Electron Mobility Transistors of the bidirectional switch to be always on and controlling a second Gate of the second pair of Gallium-Nitride (GaN) High Electron Mobility Transistors to be either on or off in the first mode of operation, and controlling the first Gate and the second Gate of the first pair of Gallium-Nitride (GaN) High Electron Mobility Transistors and the first Gate and the second Gate of the second pair Gallium-Nitride (GaN) High Electron Mobility Transistors to be either on or off in the second mode of operation, such that during zero voltage switching (ZVS) commutations the first Gate of the first pair of Gallium-Nitride (GaN) High Electron Mobility Transistors is on, the second Gate of the first pair of Gallium-Nitride (GaN) High Electron Mobility Transistors is off, and the first Gate and the second Gate of the second pair of Gallium-Nitride (GaN) High Electron Mobility Transistors are off.

In accordance with at least some embodiments, a non-transitory computer readable storage medium has instructions stored thereon that when executed by a processor perform a method of controlling bidirectional switch Gate drive logic (e.g., Safe+ Mode switching). The method comprises determining whether a bidirectional switch is in a first mode of operation based on when an AC mains voltage is equal to or greater than a predetermined voltage or in a second mode of operation when the AC mains voltage is less than the predetermined voltage, controlling a first Gate of a first pair of Gallium-Nitride (GaN) High Electron Mobility Transistors of the bidirectional switch to be always on and controlling a second Gate of the first pair Gallium-Nitride (GaN) High Electron Mobility Transistors to be either on or off in the first mode of operation, controlling a first Gate of a second pair of Gallium-Nitride (GaN) High Electron Mobility Transistors of the bidirectional switch to be always on and controlling a second Gate of the second pair of Gallium-Nitride (GaN) High Electron Mobility Transistors to be either on or off in the first mode of operation, and controlling the first Gate and the second Gate of the first pair of Gallium-Nitride (GaN) High Electron Mobility Transistors and the first Gate and the second Gate of the second pair Gallium-Nitride (GaN) High Electron Mobility Transistors to be either on or off in the second mode of operation, such that during zero voltage switching (ZVS) commutations the first Gate of the first pair of Gallium-Nitride (GaN) High Electron Mobility Transistors is on, the second Gate of the first pair of Gallium-Nitride (GaN) High Electron Mobility Transistors is off, and the first Gate and the second Gate of the second pair of Gallium-Nitride (GaN) High Electron Mobility Transistors are off.

Various advantages, aspects, and novel features of the present disclosure may be appreciated from a review of the following detailed description of the present disclosure, along with the accompanying figures in which like reference numerals refer to like parts throughout.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 4 is a schematic diagram of low-to-high ZVS switching sequence for a pair of BDS devices in a normal switching mode and a safe+ switching mode, in accordance with embodiments of the present disclosure;

FIG. 5 is a flowchart of a method of controlling bidirectional switch Gate drive logic (e.g., Safe+ Mode switching), in accordance with embodiments of the present disclosure; and FIG. 6 is a graph comparing voltage over-shoot in a conventional safe mode vs. voltage over-shoot in a safe+ mode, in accordance with embodiments of the present disclosure.

DETAILED DESCRIPTION

Embodiments of the present disclosure are directed to methods and apparatus for controlling switch Gate logic in a power converter. For example, a cycloconverter configured for use with a power converter can comprise a bidirectional switch comprising a first pair of Gallium-Nitride (GaN) High Electron Mobility Transistors and a second pair of Gallium-Nitride (GaN) High Electron Mobility Transistors. The bidirectional switch is operable in a first mode of operation when an AC mains voltage is equal to or greater than a predetermined voltage and a second mode of operation when the AC mains voltage is less than the predetermined voltage. In the first mode of operation a first Gate of the first pair of Gallium-Nitride (GaN) High Electron Mobility Transistors is always on and a second Gate of the first pair Gallium-Nitride (GaN) High Electron Mobility Transistors is either on or off. Similarly, in the first mode of operation a first Gate of the second pair of Gallium-Nitride (GaN) High Electron Mobility Transistors is always on and a second Gate of the second pair of Gallium-Nitride (GaN) High Electron Mobility Transistors is either on or off. In the second mode of operation, the first Gate and the second Gate of the first pair of Gallium-Nitride (GaN) High Electron Mobility Transistors and the first Gate and the second Gate of the second pair Gallium-Nitride (GaN) High Electron Mobility Transistors are either on or off. In doing so, during ZVS commutations the first Gate of the first pair of Gallium- Nitride (GaN) High Electron Mobility Transistors is on, the second Gate of the first pair of Gallium-Nitride (GaN) High Electron Mobility Transistors is off, and the first Gate and the second Gate of the second pair of Gallium-Nitride (GaN) High Electron Mobility Transistors are off. The methods and apparatus provided herein provide decreased Gate drive power consumption and decreases, if not eliminates, a likelihood of voltage over-shoot at the end of each ZVS communication.

The foregoing description of embodiments of the disclosure comprises a number of elements, devices, circuits and/or assemblies that perform various functions as described. These elements, devices, circuits, and/or assemblies are exemplary implementations of means for performing their respectively described functions.

Figure 1:
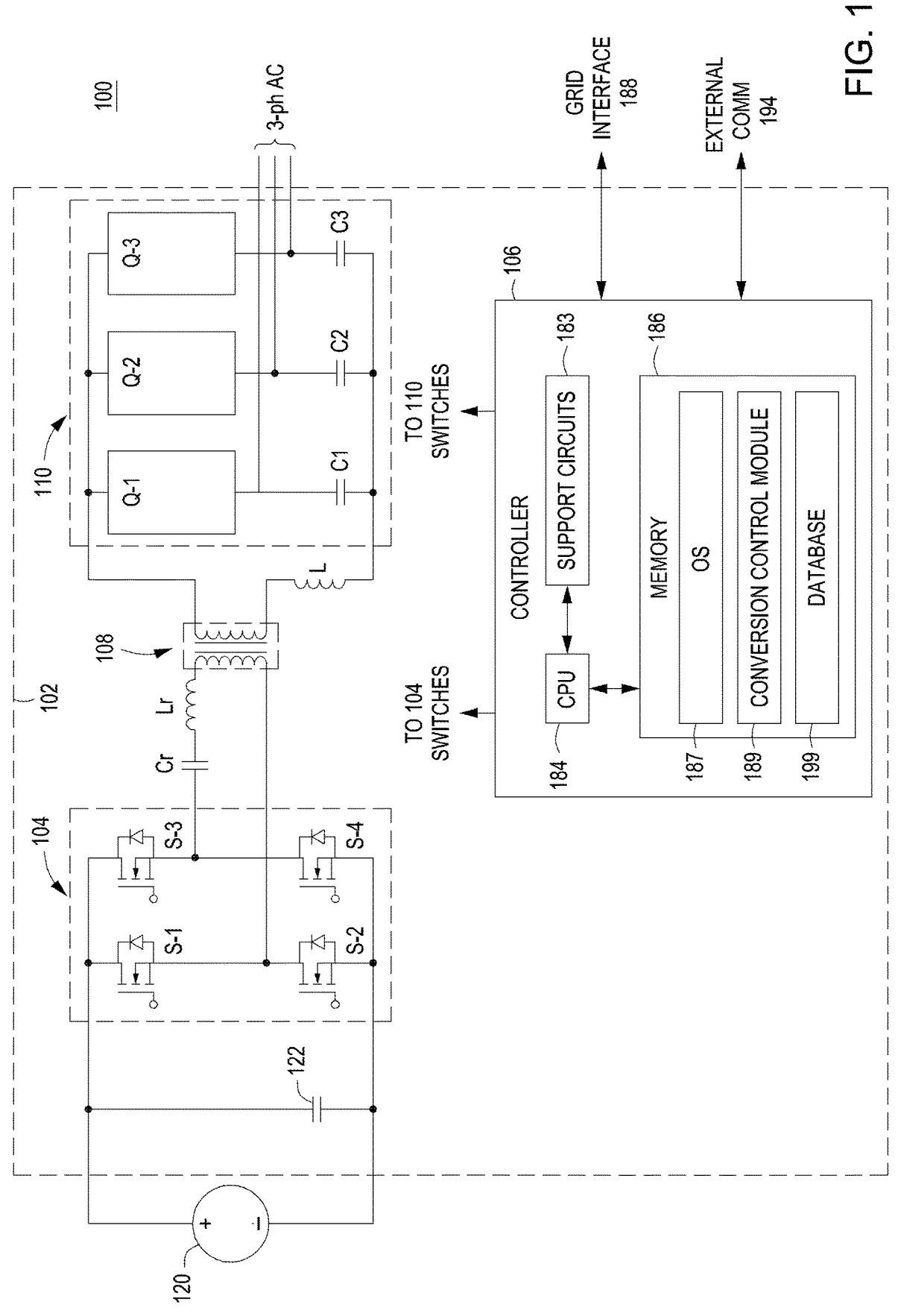
FIG. 1 is a schematic diagram of a power conversion system comprising a switched mode power converter, in accordance with embodiments of the present disclosure.

FIG. 1 is a schematic diagram of a power conversion system 100 comprising a converter 102 (e.g., a switched mode power converter) in accordance with embodiments of the present disclosure. This diagram only portrays one variation of the myriad of possible system configurations. The present disclosure can function in a variety of power generation environments and systems.

The power conversion system 100 comprises a DC component 120, such as a PV module or a battery, coupled to a DC side of the converter 102 (referred to herein as "converter 102"). In other embodiments the DC component 120 may be any suitable type of DC components, such as another type of renewable energy source (e.g., wind farms, hydroelectric systems, and the like), other types of energy storage components, and the like.

The converter 102 comprises a capacitor 122 coupled across the DC component 120 as well as across an H-bridge 104 formed from switches S-1, S-2, S-3 and S-4. The switches S-1 and S-2 are coupled in series to form a left leg of the H-bridge 104, and the switches S-3 and S-4 are coupled in series to form a right leg of the H-bridge 104.

The output of the H-bridge 104 is coupled across a series combination of a capacitor Cr and inductor L, which form a resonant tank, and the primary winding of a transformer 108. In other embodiments, the resonant tank may be formed by a different configuration of the capacitor Cr and the inductor Lr (e.g., the capacitor Cr and the inductor L may be coupled in parallel); in some embodiments, Lr may represent a leakage inductance from the transformer 108 rather than a physical inductor.

A series combination of the secondary winding of the transformer 108 and an inductor L is coupled across a cycloconverter 110 which produces a three-phase AC output, although in other embodiments the cycloconverter 110 may produce one or two phases of AC at its output. The cycloconverter is a bridge of bidirectional switches that are able to process AC energy. For example, bidirectional switches can conduct current in either direction (when turned on), can block a voltage of either polarity (when turned off), and can also block a voltage in both polarities. The cycloconverter 110 comprises three 4Q bi-directional switches Q-1, Q-2, and Q-3 (which may be collectively referred to as switches Q) respectively in a first leg, a second leg, and a third leg coupled in parallel to one another. In accordance with embodiments of the present disclosure, each of the switches Q-1, Q-2, and Q-3 is a native four quadrant bi-directional switch, described in detail further below with respect to FIG. 3.

The first cycloconverter leg comprises the 4Q switch Q-1 coupled to a capacitor C1, the second cycloconverter leg comprises the 4Q switch Q-2 coupled to a capacitor C2, and the third cycloconverter leg comprises a 4Q switch Q-3 coupled to a capacitor C3. A first AC output phase line is coupled between the switch Q-1 and the capacitor C1, a second AC output phase line is coupled between the switch Q-2 and the capacitor C2, and a third AC output phase line is coupled between the switch Q-3 and the capacitor C3. The converter 102 may also include additional circuitry not shown, such as voltage and/or current monitors, for obtaining data for power conversion, data reporting, and the like.

The converter 102 additionally comprises a controller 106 coupled to the H-bridge switches (S-1, S-2, S-3, and S-4) and the cycloconverter switches (Q-1, Q-2, and Q-3) for operatively controlling the switches to generate the desired output power. In some embodiments, the converter 102 may function as a bi-directional converter.

The controller 106 comprises a CPU 184 coupled to each of support circuits 183 and a memory 186. The CPU 184 may comprise one or more conventionally available microprocessors or microcontrollers. Additionally or alternatively, the CPU 184 may include one or more application specific integrated circuits (ASICs). The support circuits 183 are well known circuits used to promote functionality of the CPU 184. Such circuits include, but are not limited to, a cache, power supplies, clock circuits, buses, input/output (I/O) circuits, and the like. The controller 106 may be implemented using a general purpose computer that, when executing particular software, becomes a specific purpose computer for performing various embodiments of the present disclosure.

The memory 186 is a non-transitory computer readable storage medium such as random access memory, read only memory, removable disk memory, flash memory, and various combinations of these types of memory. The memory 186 is sometimes referred to as main memory and may, in part, be used as cache memory or buffer memory. The memory 186 generally stores the OS 187 (operating system), if necessary, of the controller 106 that can be supported by the CPU capabilities. In some embodiments, the OS 187 may be one of a number of commercially available operating systems such as, but not limited to, LINUX, Real-Time Operating System (RTOS), and the like.

The memory 186 may store various forms application software (e.g., instructions), such as a conversion control module 189 for controlling power conversion by the converter 102, for example maximum power point tracking (MPPT), switching, performing the methods described herein, and the like. The memory 186 may further store a database 199 for storing various data. The controller 106 further processes inputs and outputs to external communications 194 (i.e., gateway) and a grid interface 188.

Figure 2:
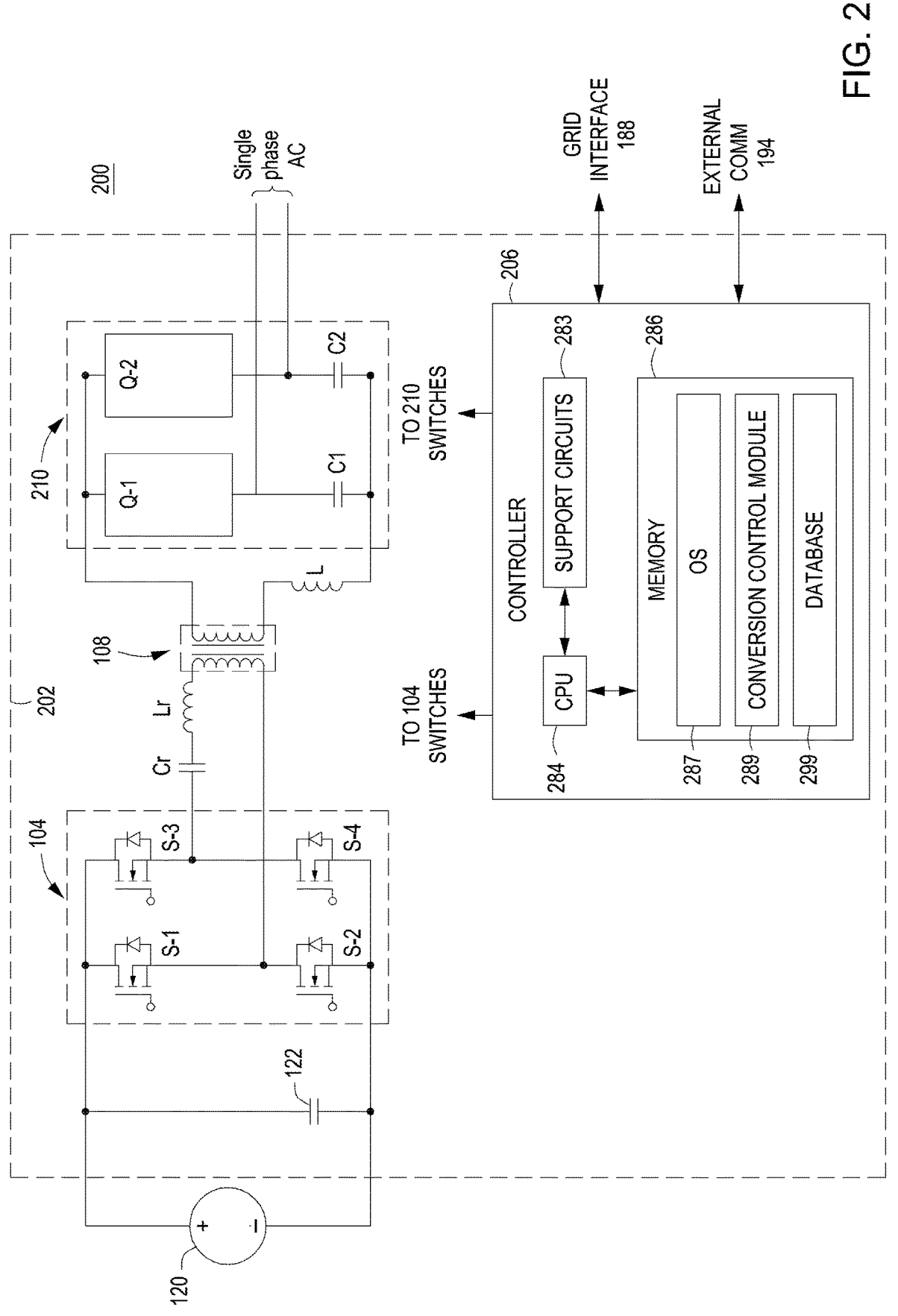
FIG. 2 is a schematic diagram of a power conversion system comprising a switched mode power converter, in accordance with embodiments of the present disclosure.

FIG. 2 is a schematic diagram of a power conversion system 200 comprising a converter 202 (e.g., a switched mode power converter) in accordance with embodiments of the present disclosure.

The power conversion system 200 comprises the DC component 120 coupled to a DC side of the converter 202. The converter 202 comprises the capacitor 122 coupled across the DC component 120 and the H-bridge 104, as described above with respect to the converter 102. The output of the H-bridge 104 is coupled across a series combination of the capacitor Cr and the inductor Lr, which form a resonant tank, and the primary winding of the transformer 108, as described above with respect to the converter 102. In other embodiments, the resonant tank may be formed by a different configuration of the capacitor Cr and the inductor Lr (e.g., the capacitor Cr and the inductor L may be coupled in parallel); in some embodiments, Lr may represent a leakage inductance of the transformer 108 rather than a physical inductor.

A series combination of the secondary winding of the transformer 108 and the inductor L is coupled across a cycloconverter 210 which produces a single-phase AC output. The cycloconverter 210 comprises two bi-directional switches Q-1 and Q-2, (collectively referred to as switches Q) respectively in a first leg and a second leg coupled in parallel to one another. In accordance with embodiments of the present disclosure, each of the switches Q-1 and Q-2 is a native four quadrant bi-directional switch, described in detail further below with respect to FIG. 3.

The first cycloconverter leg comprises the 4Q switch Q-1 coupled to the capacitor C1, and the second cycloconverter leg comprises the 4Q switch Q-2 coupled to the capacitor C2. A first AC output phase line is coupled between the switch Q-1 and the capacitor C1, and a second AC output phase line is coupled between the switch Q-2 and the capacitor C2. The converter 202 may also include additional circuitry not shown, such as voltage and/or current monitors, for obtaining data for power conversion, data reporting, and the like.

The converter 202 additionally comprises a controller 206 coupled to the H-bridge switches (S-1, S-2, S-3, and S-4), and the cycloconverter switches (Q-1 and Q-2) for operatively controlling the switches to generate the desired output power. In some embodiments, the converter 202 may function as a bi-directional converter.

The controller 206 comprises a CPU 284 coupled to each of support circuits 283 and a memory 286. The CPU 284 may comprise one or more conventionally available microprocessors or microcontrollers. Additionally or alternatively, the CPU 284 may include one or more application specific integrated circuits (ASICs). The support circuits 283 are well known circuits used to promote functionality of the CPU 284. Such circuits include, but are not limited to, a cache, power supplies, clock circuits, buses, input/output (I/O) circuits, and the like. The controller 206 may be implemented using a general purpose computer that, when executing particular software, becomes a specific purpose computer for performing various embodiments of the present disclosure.

The memory 286 is a non-transitory computer readable medium such as random access memory, read only memory, removable disk memory, flash memory, and various combinations of these types of memory. The memory 286 is sometimes referred to as main memory and may, in part, be used as cache memory or buffer memory. The memory 286 generally stores the OS 287 (operating system), if necessary, of the controller 206 that can be supported by the CPU capabilities. In some embodiments, the OS 287 may be one of a number of commercially available operating systems such as, but not limited to, LINUX, Real-Time Operating System (RTOS), and the like.

The memory 286 may store various forms of application software, such as a conversion control module 289 for controlling power conversion by the converter 202, for example maximum power point tracking (MPPT), switching, and the like. The memory 286 may further store a database 299 for storing various data. The controller 206 further processes inputs and outputs to external communications 194 (i.e., gateway) and the grid interface 188.

Figure 3:
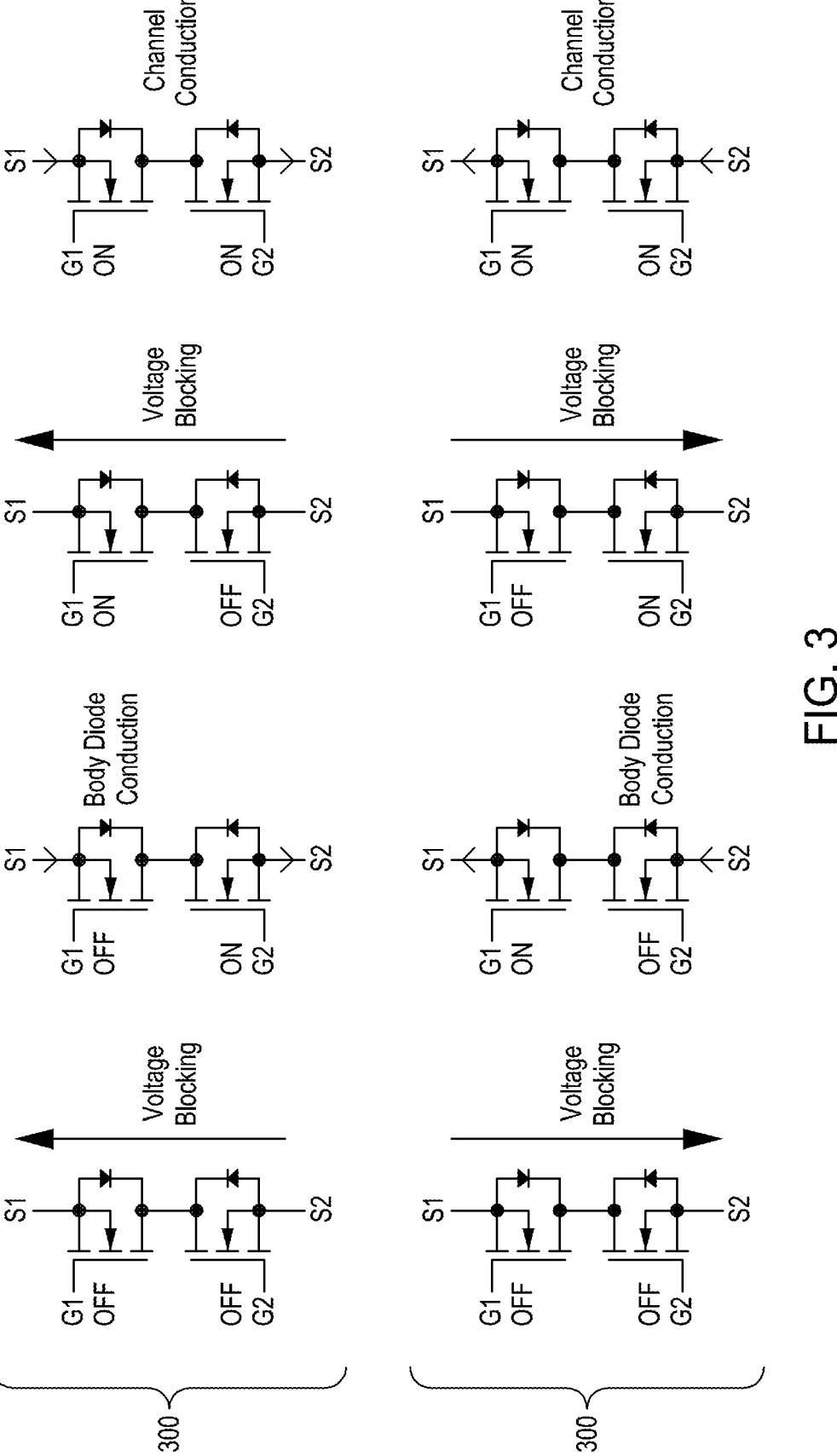
FIG. 3 is a schematic diagram of system level behavior of the switch Q, in accordance with embodiments of the present disclosure.

FIG. 3 is a schematic diagram of system level behavior of the 4Q switch in accordance with embodiments of the present disclosure. For example, a bidirectional switch (BDS) can be configured by connecting a pair of unidirectional GaN HEMT devices in a common-Drain or merged-Drain configuration. The system level behavior of bidirectional switches is dependent on the states of two Gates G1 and G2 of the GaN HEMT devices 300. For example, as illustrated in FIG. 3, eight (8) different switch states of the GaN HEMT devices are possible and can be based on four (4) different combinations of two switch states (ON or OFF) for the Gates G1 and G2, with two different applied blocking voltage/current conduction polarities (positive or negative).

For example, to turn the GaN HEMT devices 300 ON so that the GaN HEMT devices 300 conducts current, the Gates G1 and G2 are turned ON, which causes current to flow through the channel of the GaN HEMT devices 300 (e.g., a series pair of HEMTs). Conversely. turning both the Gates G1 and G2 OFF causes the current flow through the GaN HEMT devices 300 to be interrupted and results in the GaN HEMT devices 300 blocking the voltage applied thereacross. Depending on the polarity of the applied blocking voltage, however, only requires one of the Gates G1 and G2 to be turned OFF to interrupt the current flow through the GaN HEMT devices 300 and results in the GaN HEMT devices 300 blocking the applied voltage. For example, with Gate G1=ON and Gate G2=OFF, a positive applied blocking voltage (VS1>VS2) can be blocked. Likewise, with Gate G1=OFF and Gate G2=ON a negative applied blocking voltage (VS2>VS1) can also be blocked.

FIG. 4 is a schematic diagram of low-to-high ZVS switching sequence for a pair of GaN HEMT devices (configured as a BDS device) in a Normal Switching mode and a Safe+ Switching mode in accordance with embodiments of the present disclosure. For example, the pair of GaN HEMT devices can comprise a first pair of GaN HEMT devices 400 and a second pair of GaN HEMT devices 402 connected in series with each other. Additionally, the first pair of GaN HEMT devices 400 and the second pair of GaN HEMT devices 402 are each connected in a common-Drain configuration, as described above.

Normal mode switching is predicated on control logic knowing a blocking voltage polarity across the BDS device. The blocking voltage is the voltage across the BDS device when the BDS device is in the OFF state and the polarity of the blocking voltage is equal to the polarity of the AC mains voltage. Additionally, Normal Mode switching is implemented by keeping one Gate (a Gate 401) turned ON all of the time and only turning the other Gate (a Gate 403) ON and OFF to affect the switching of the BDS device. For a given AC mains voltage polarity, the Gate of the BDS that is turned ON and OFF to affect the switching is called the forward Gate and the Gate that is kept turned ON is called the reverse Gate. As can be appreciated, the definition for the forward and reverse Gates is dependent on the AC mains voltage polarity (blocking voltage polarity), hence the forward and reverse Gate functions swap positions at the AC mains frequency.

There are two specific benefits in using Normal Mode switching rather than turning both BDS Gates OFF to interrupt the current flow through the BDS. For example, with respect to reduced Gate drive power consumption, the Gates of the BDS device exhibit a Gate capacitance and, therefore, require a certain amount of energy (electrical charge) to turn the BDS Gate ON. For example, each switching cycle requires the BDS Gate to be turned ON then OFF consuming a specific amount of energy. Thus, if both BDS Gates are cycled ON and OFF, the amount of Gate energy used is about twice what is required using the Normal Mode switching scheme that only turns ON and OFF the forward Gate of the BDS device (while leaving the reverse Gate turned ON the entire switching cycle).

Moreover, with respect to ZVS diode catch function, zero voltage switching (ZVS) commutations are used to achieve lossless switching (soft-switching) in the power converters (microinverters). For example, a ZVS switching commutation is achieved by ensuring that a BDS load current flows in a favorable direction (polarity) immediately prior to the initiation of the ZVS commutation. The ZVS commutation is then initiated by turning OFF the forward Gate of the BDS device that is currently turned ON (e.g., a Gate 404 of the second pair of GaN HEMT devices 402, see A to B in the Normal Mode switching diagram). When the forward Gate is turned OFF, a favorable current direction will cause the ZVS commutation to occur, e.g., a voltage across the BDS device that had been turned ON will increase and a voltage across the BDS device that is going to turn ON will decrease towards zero (e.g., the Gate 403 of the first pair of GaN HEMT devices 400, see B to C in the Normal Mode switching diagram). The concept with ZVS commutations is that the load current will drive a natural voltage commutation and then at the end of this commutation the BDS device that is turned ON will be turned ON with a zero-voltage imposed across the BDS device (e.g., the Gate 403 of the first pair of GaN HEMT devices 400, see C in the Normal Mode switching diagram). A body diode (e.g., a ZVS catch diode 405) of a pair of body diodes, which can be connected between Drains of the first pair of GaN HEMT devices 400), associated with the forward FET (Field Effect Transistor) of the BDS device that is turned ON at the end of the ZVS period performs a useful function during ZVS commutations. That is, the ZVS catch diode 405 performs a catch function which effectively catches the commutating voltage ensuring that the commutation does not over-shoot, as described in greater detail below. At the end of the ZVS commutation period when the voltage across the BDS device that will be turning ON falls towards zero, the ZVS catch diode 405 acts as a clamp and ensures the commutation voltage does not over-shoot. Should the ZVS commutation voltage try to fall below zero, the ZVS catch diode 405 becomes forward biased, and ZVS catch diode 405 conducts current (see FIG. 3, G1 ON and G2 OFF, body diode conduction).

An inherent limitation exists with Normal Mode switching which comes from the requirement for the polarity of the AC mains voltage (blocking voltage polarity) to be known to know which of the two Gates is the forward Gate and, hence, which Gate should be turned ON and OFF to affect switching. Part of the limitation stems from the realization that the BDS blocking voltage is only defined when the BDS is turned OFF, however, the blocking voltage polarity needs to be correctly known while the BDS is ON when no blocking voltage is present. If the AC mains voltage polarity is incorrectly identified, the wrong Gate of the BDS will be turned OFF, which will not become apparent until after the event, which is too late.

While the AC mains voltage has a high absolute instantaneous value, a polarity of the AC mains voltage can be determined with a high degree of certainty. As the instantaneous AC mains voltage approaches a zero-voltage crossing point, however, there comes a point when determining the voltage polarity with certainty becomes difficult (and almost impossible at the zero-voltage crossing point). The inherent weakness related to Normal Mode switching comes from the need to know with certainty the polarity of the AC mains voltage (blocking voltage polarity) on the basis that getting the polarity wrong and turning OFF the wrong Gate of the BDS device will not result in the desired result of blocking the BDS current.

Additionally, if the wrong Gate of the BDS is turned OFF, then a body diode of the FET that is turned OFF will provide a path for current to flow from the AC mains source directly through the BDS device, which can result in the BDS device providing a short circuit directly across the AC mains voltage source. The short circuit can lead to a degenerative condition, e.g., noise created by the short circuit condition makes correctly identifying the correct AC mains voltage polarity much more difficult. The degenerative condition can persist for a period until the instantaneous AC mains voltage becomes large enough that the correct polarity can be identified despite the noise generated by the short circuit condition. As noted above, the degenerative condition can contribute to EMI.

In view of the foregoing, the inventors provide herein improved safe mode switching methods and apparatus that are configured for eliminating the degenerative condition that results from not being able to correctly identify the AC mains voltage polarity. For example, continuing with reference to FIG. 4, Safe+ Mode switching was developed as an improvement over conventional Safe Mode switching. For example, Safe+ Mode switching described herein is effective at eliminating the voltage over-shoot condition observed when GaN HEMT devices are used, and decreases, if not eliminates, an impact that the voltage over-shoot condition has on the EMI signature. For example, Safe+ Mode switching uses a blocking voltage of about 30V to determine a ±5° period of each AC mains (half) cycle. For example, when the BDS device is conducting current, both Gates are turned ON, and when the BDS needs to be turned OFF (e.g., so that the load current is interrupted), both Gates are turned OFF at the same time.

FIG. 5 is a flowchart of a method 500 of controlling bidirectional switch Gate drive logic (e.g., Safe+ Mode switching) in accordance with embodiments of the present disclosure.

For example, at 502, the method 500 can comprise determining whether a bidirectional switch is in a first mode of operation based on when an AC mains voltage is equal to or greater than a predetermined voltage or in a second mode of operation when the AC mains voltage is less than the predetermined voltage. For example, the controller (e.g., the controller 106 or the controller 206) is configured to determine when one or more 4Q switches described above are in the Normal Mode of operation or the Safe+ Mode of operation based on the AC mains (single phase or three phase) voltage being less than about 30V (Normal Mode of operation) or greater than or equal to about 30V (Safe+ Mode of operation).

Next, at 504, the method 500 comprises controlling a first Gate of a first pair of Gallium-Nitride (GaN) High Electron Mobility Transistors of the bidirectional switch to be always on and controlling a second Gate of the first pair Gallium-Nitride (GaN) High Electron Mobility Transistors to be either on or off when the bidirectional switch is in the first mode of operation. For example, as noted above, during Normal Mode of operation, the controller controls the Gate 401 (e.g., of the first pair of GaN HEMT devices 400) to be always on and controls the Gate 403 (e.g., of the first pair of GaN HEMT devices 400) to be either on or off.

Similarly, at 506, the method 500 comprises controlling a first Gate of a second pair of Gallium-Nitride (GaN) High Electron Mobility Transistors of the bidirectional switch to be always on and a controlling a second Gate of the second pair of Gallium-Nitride (GaN) High Electron Mobility Transistors to be either on or off when the bidirectional switch is in the first mode of operation. For example, during Normal Mode of operation, the controller controls the Gate 406 (e.g., of the second pair of GaN HEMT devices 402) to be always on and controls the Gate 404 (e.g., of the second pair of GaN HEMT devices 402) to be either on or off.

Next, at 508, the method 500 comprises controlling the first Gate and the second Gate of the first pair of Gallium-Nitride (GaN) High Electron Mobility Transistors and the first Gate and the second Gate of the second pair Gallium-Nitride (GaN) High Electron Mobility Transistors to be either on or off when the bidirectional switch is in the second mode of operation. Accordingly, during ZVS commutations, the first Gate (e.g., the Gate 401) of the first pair of Gallium-Nitride (GaN) High Electron Mobility Transistors is on, the second Gate (e.g., the Gate 403) of the first pair of Gallium-Nitride (GaN) High Electron Mobility Transistors is off, and the first Gate (e.g., the Gate 406) and the second Gate (e.g., the Gate 404) of the second pair of Gallium-Nitride (GaN) High Electron Mobility Transistors are off.

For example, prior to 508, the forward Gates (e.g., the Gate 406 and the Gate 404) that are currently ON are simultaneously turned OFF (e.g., see A to B in the Safe+ Mode switching diagram), and at the same time the reverse Gate that will be ON at the end of the ZVS period is turned ON (e.g., the Gate 401, see A to B in the Safe+ Mode switching diagram).

During the ZVS period, both Gates of the bidirectional switch that were turned OFF at 508 are maintained OFF (e.g., the Gate 404 and the Gate 406, see B in the Safe+ Mode switching diagram). In doing so, the load current forces a voltage across the bidirectional switch to commutate (e.g., reverse or regulate). Additionally, the forward Gate of the bidirectional switch that will be turned ON at the end of the ZVS period (e.g., the Gate 403, see B in the Safe+ Mode switching diagram) is maintained OFF, and the reverse Gate of the bidirectional switch device that will be on at the end of this ZVS period is maintained ON (e.g., the Gate 401, see B in the Safe+ Mode switching diagram).

Next, the method 500 can comprise terminating the ZVS commutation. For example, the forward Gate (e.g., the Gate 403) which was kept OFF at 508 is turned ON (see C in the Safe+ Mode switching diagram).

The method 500 described herein (e.g., the Safe+ Mode switching logic) effectively diminishes, if not eliminates, the effects of voltage over-shoot. For example, FIG. 6 is a graph 600 comparing voltage over-shoot in a conventional Safe Mode vs. a voltage over-shoot in a Safe+ Mode in accordance with embodiments of the present disclosure. For example, as noted above, conventional Safe Mode switching 602 during Safe Mode operation exhibits excessive voltage over-shoot (see voltage over-shoot 604) and consequential hard-switching can result in an increase in the EMI signature of an microinverter. Conversely, using the Safe+ Mode switching 606 described herein reduces, if not eliminates, voltage over-shoot, e.g., cf. Safe Mode switching 602 (top) with Safe+ Mode switching 606 (bottom).

In at least some embodiments, the methods described herein can also be incorporated directly into a Gate driver. For example, rather than use the above described controllers comprising the CPUs with/without one or more application specific integrated circuits (ASICs), the Gate driver can be configured to perform the methods described herein using minimal logic (e.g., without using one or more of a CPU, memory, code, etc.).

While the foregoing is directed to embodiments of the present disclosure, other and further embodiments of the disclosure may be devised without departing from the basic scope thereof, and the scope thereof is defined by the claims that follow.

The invention claimed is:

1. A cycloconverter configured for use with a power converter, comprising:

a bidirectional switch comprising a first pair of Gallium-Nitride (GaN) High Electron Mobility Transistors and a second pair of Gallium-Nitride (GaN) High Electron Mobility Transistors, the bidirectional switch operable in a first mode of operation when an AC mains voltage is equal to or greater than a predetermined voltage and a second mode of operation when the AC mains voltage is less than the predetermined voltage, wherein in the first mode of operation a first Gate of the first pair of Gallium-Nitride (GaN) High Electron Mobility Transistors is always on and a second Gate of the first pair Gallium-Nitride (GaN) High Electron Mobility Transistors is either on or off, wherein in the first mode of operation a first Gate of the second pair of Gallium-Nitride (GaN) High Electron Mobility Transistors is always on and a second Gate of the second pair of Gallium-Nitride (GaN) High Electron Mobility Transistors is either on or off, and wherein in the second mode of operation the first Gate and the second Gate of the first pair of Gallium-Nitride (GaN) High Electron Mobility Transistors and the first Gate and the second Gate of the second pair Gallium-Nitride (GaN) High Electron Mobility Transistors are either on or off, such that during zero voltage switching (ZVS) commutations the first Gate of the first pair of Gallium-Nitride (GaN) High Electron Mobility Transistors is on, the second Gate of the first pair of Gallium-Nitride (GaN) High Electron Mobility Transistors is off, and the first Gate and the second Gate of the second pair of Gallium-Nitride (GaN) High Electron Mobility Transistors are off.

2. The cycloconverter of claim 1, wherein the predetermined voltage is 30V.

3. The cycloconverter of claim 1, wherein a pair of body diodes are connected between Drains of each of the first pair of Gallium-Nitride (GaN) High Electron Mobility Transistors and the second pair of Gallium-Nitride (GaN) High Electron Mobility Transistors.

4. The cycloconverter of claim 1, wherein each of the first pair of Gallium-Nitride (GaN) High Electron Mobility Transistors and the second pair of Gallium-Nitride (GaN) High Electron Mobility Transistors are connected in a common-Drain configuration.

5. A method of controlling bidirectional switch Gate drive logic (e.g., safe+mode switching) comprising:

determining whether a bidirectional switch is in a first mode of operation based on when an AC mains voltage is equal to or greater than a predetermined voltage or in a second mode of operation when the AC mains voltage is less than the predetermined voltage;

controlling a first Gate of a first pair of Gallium-Nitride (Gan) High Electron Mobility Transistors of the bidirectional switch to be always on and controlling a second Gate of the first pair Gallium-Nitride (Gan) High Electron Mobility Transistors to be either on or off in the first mode of operation;

controlling a first Gate of a second pair of Gallium-Nitride (Gan) High Electron Mobility Transistors of the bidirectional switch to be always on and controlling a second Gate of the second pair of Gallium-Nitride (Gan) High Electron Mobility Transistors to be either on or off in the first mode of operation; and controlling the first Gate and the second Gate of the first pair of Gallium-Nitride (Gan) High Electron Mobility Transistors and the first Gate and the second Gate of the second pair Gallium-Nitride (Gan) High Electron Mobility Transistors to be either on or off in the second mode of operation, such that during zero voltage switching (zvs) commutations the first Gate of the first pair of Gallium-Nitride (Gan) High Electron Mobility Transistors is on, the second Gate of the first pair of Gallium-Nitride (Gan) High Electron Mobility Transistors is off, and the first Gate and the second Gate of the second pair of Gallium-Nitride (Gan) High Electron Mobility Transistors are off.

6. The method of claim 5, wherein the predetermined voltage is 30V.

7. The method of claim 5, wherein a pair of body diodes are connected between Drains of each of the first pair of Gallium-Nitride (GaN) High Electron Mobility Transistors and the second pair of Gallium-Nitride (GaN) High Electron Mobility Transistors.

8. The method of claim 5, wherein each of the first pair of Gallium-Nitride (GaN) High Electron Mobility Transistors and the second pair of Gallium-Nitride (GaN) High Electron Mobility Transistors are connected in a common-Drain configuration.

9. A non-transitory computer readable storage medium having instructions stored thereon that when executed by a processor perform a method of controlling bidirectional switch Gate drive logic (e.g., Safe+Mode switching) comprising:

determining whether a bidirectional switch is in a first mode of operation based on when an AC mains voltage is equal to or greater than a predetermined voltage or in a second mode of operation when the AC mains voltage is less than the predetermined voltage;

controlling a first Gate of a first pair of Gallium-Nitride (GaN) High Electron Mobility Transistors of the bidirectional switch to be always on and controlling a second Gate of the first pair Gallium-Nitride (GaN) High Electron Mobility Transistors to be either on or off in the first mode of operation;

controlling a first Gate of a second pair of Gallium-Nitride (GaN) High Electron Mobility Transistors of the bidirectional switch to be always on and controlling a second Gate of the second pair of Gallium-Nitride (GaN) High Electron Mobility Transistors to be either on or off in the first mode of operation; and controlling the first Gate and the second Gate of the first pair of Gallium-Nitride (GaN) High Electron Mobility Transistors and the first Gate and the second Gate of the second pair Gallium-Nitride (GaN) High Electron Mobility Transistors to be either on or off in the second mode of operation, such that during zero voltage switching (ZVS) commutations the first Gate of the first pair of Gallium-Nitride (GaN) High Electron Mobility Transistors is on, the second Gate of the first pair of Gallium-Nitride (GaN) High Electron Mobility Transistors is off, and the first Gate and the second Gate of the second pair of Gallium-Nitride (GaN) High Electron Mobility Transistors are off.

10. The non-transitory computer readable storage medium of claim 9, wherein the predetermined voltage is 30V.

11. The non-transitory computer readable storage medium of claim 9, wherein a pair of body diodes are connected between Drains of each of the first pair of Gallium-Nitride (GaN) High Electron Mobility Transistors and the second pair of Gallium-Nitride (GaN) High Electron Mobility Transistors.

12. The non-transitory computer readable storage medium of claim 9, wherein each of the first pair of Gallium-Nitride (GaN) High Electron Mobility Transistors and the second pair of Gallium-Nitride (GaN) High Electron Mobility Transistors are connected in a common-Drain configuration.

* * * * *